(12) United States Patent
Yoo et al.

(10) Patent No.: US 11,984,601 B2
(45) Date of Patent: May 14, 2024

(54) CONDUCTIVE MATERIAL DISPERSION LIQUID, ELECTRODE AND LITHIUM SECONDARY BATTERY PREPARED BY USING THE SAME

(71) Applicant: LG ENERGY SOLUTION, LTD., Seoul (KR)

(72) Inventors: Houng Sik Yoo, Daejeon (KR); Hyeon Choi, Daejeon (KR); Dong Hyun Kim, Daejeon (KR); Hyun Sik Chae, Daejeon (KR); Sang Hoon Choy, Daejeon (KR); Hyung Suk Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 667 days.

(21) Appl. No.: 17/051,689

(22) PCT Filed: Aug. 21, 2019

(86) PCT No.: PCT/KR2019/010648
§ 371 (c)(1),
(2) Date: Oct. 29, 2020

(87) PCT Pub. No.: WO2020/040545
PCT Pub. Date: Feb. 27, 2020

(65) Prior Publication Data
US 2021/0234174 A1   Jul. 29, 2021

(30) Foreign Application Priority Data
Aug. 21, 2018   (KR) .................. 10-2018-0097260

(51) Int. Cl.
| | |
|---|---|
| *H01M 4/62* | (2006.01) |
| *C01B 32/174* | (2017.01) |
| *H01M 4/02* | (2006.01) |
| *H01M 10/0525* | (2010.01) |

(52) U.S. Cl.
CPC ........... *H01M 4/625* (2013.01); *C01B 32/174* (2017.08); *H01M 10/0525* (2013.01); *C01B 2202/22* (2013.01); *C01B 2202/28* (2013.01); *C01B 2202/32* (2013.01); *H01M 2004/028* (2013.01)

(58) Field of Classification Search
None
See application file for complete search history.

(56) References Cited

U.S. PATENT DOCUMENTS

| | | |
|---|---|---|
| 2014/0127571 A1 | 5/2014 | Moroishi et al. |
| 2016/0020466 A1 | 1/2016 | Ulbrich et al. |
| 2018/0175370 A1 | 6/2018 | Kim et al. |
| 2018/0233734 A1 | 8/2018 | Ahn et al. |
| 2018/0301744 A1 | 10/2018 | Fukumine et al. |
| 2019/0044150 A1 | 2/2019 | Kim et al. |
| 2021/0005894 A1 | 1/2021 | Vurase et al. |

FOREIGN PATENT DOCUMENTS

| | | |
|---|---|---|
| CN | 103597637 | 2/2014 |
| EP | 3333946 A1 | 6/2018 |
| EP | 3770204 A1 | 1/2021 |
| JP | H09-213337 A | 8/1997 |
| JP | 2015135773 | 7/2015 |
| JP | 6079386 B2 | 2/2017 |
| KR | 10-0854540 B1 | 8/2008 |
| KR | 10-20090054677 A | 6/2009 |
| KR | 10-20150067049 A | 6/2015 |
| KR | 10-20170111740 A | 10/2017 |
| KR | 10-20170111749 A | 10/2017 |
| KR | 10-20170113212 A | 10/2017 |
| KR | 10-20180021698 A | 3/2018 |
| WO | 2014128190 A1 | 8/2014 |

*Primary Examiner* — Haroon S. Sheikh
(74) *Attorney, Agent, or Firm* — Bryan Cave Leighton Paisner LLP

(57) ABSTRACT

A conductive material dispersion liquid, and an electrode and a lithium secondary battery manufactured using the same. The conductive material dispersion liquid includes a carbon-based conductive material, a dispersant, and a dispersion medium. The dispersant is a copolymer including a first repeating unit represented by Chemical Formula 1, a second repeating unit represented by Chemical Formula 2, and a third repeating unit represented by Chemical Formula 3, and the dispersion medium is a non-aqueous solvent.

13 Claims, No Drawings

CONDUCTIVE MATERIAL DISPERSION LIQUID, ELECTRODE AND LITHIUM SECONDARY BATTERY PREPARED BY USING THE SAME

CROSS-REFERENCE TO RELATED APPLICATIONS

This application is a U.S. national stage of international Application No. PCT/KR2019/010648 filed Aug. 21, 2019, and claims priority from Korean patent Application No. KR 10-2018-0097260 filed Aug. 21, 2018, the contents of which are incorporated in their entirety as if fully set forth herein.

TECHNICAL FIELD

The present invention relates to a conductive material dispersion liquid, and an electrode and a lithium secondary battery prepared by using the same. More specifically, the present invention relates to a conductive material dispersion liquid, which exhibits low viscosity and excellent storage stability by using a copolymer dispersant including specific repeating units, and an electrode and a lithium secondary battery manufactured using the same.

BACKGROUND

A secondary battery is a battery that can be used repeatedly through a discharging process in which chemical energy is converted into electrical energy and a charging process which is the reverse reaction. The secondary battery consists of a positive electrode, a negative electrode, an electrolyte, and a separator, and the positive electrode and the negative electrode generally consist of an electrode current collector and an electrode active material layer formed on the electrode current collector. The electrode active material layer is formed by applying an electrode slurry composition including an electrode active material, a conductive material, a binder, and the like on an electrode current collector, followed by drying and rolling.

The conductive material is used to improve the conductivity of the electrode active material, and fine carbon materials such as carbon black, Ketjen black, fullerenes, graphene, carbon nanotubes (CNTs), and the like have been mainly used. Among those listed above, especially, CNTs have attracted attention as a conductive material because they can realize high conductivity even in a small amount.

However, CNTs are poorly dispersed in the slurry due to an inherent CNT characteristic of growing in a bundle type or an entangled type such that coatability and processability are degraded, and they are not uniformly distributed in the electrode active material layer. In order to overcome these problems, a method in which CNTs are mixed with a dispersant such as polyvinyl pyrrolidone (hereinafter, abbreviated as PVP), acrylonitrile-butadiene rubber, or the like in a solvent to prepare a conductive material dispersion liquid and then the conductive material dispersion liquid is applied to an electrode slurry composition was developed.

However, since the viscosity of the conductive material dispersion liquid prepared using the PVP dispersant is rapidly increased with an increasing content of the conductive material, there is a limitation in increasing the content of the conductive material, and accordingly, the enhancement of electrical conductivity is also limited.

Meanwhile, in order to lower the viscosity of the conductive material dispersion liquid, it is preferable to use a dispersant with a low weight-average molecular weight. However, the acrylonitrile-butadiene rubber dispersant forms a gel when a weight-average molecular weight thereof is lowered, and accordingly, storage stability is rapidly degraded.

Therefore, there is a demand for the development of a conductive material dispersion liquid which has low viscosity even when a large amount of a conductive material is included therein, and exhibits excellent storage stability.

SUMMARY

The present invention is directed to providing a conductive material dispersion liquid which exhibits low viscosity and excellent storage stability compared to those in a conventional case by using a copolymer dispersant including specific repeating units.

In addition, the present invention is directed to providing an electrode and a secondary battery which are manufactured using the conductive material dispersion liquid.

One aspect of the present invention provides a conductive material dispersion liquid which includes a carbon-based conductive material, a dispersant, and a dispersion medium, wherein the dispersant is a copolymer including a first repeating unit represented by Chemical Formula 1 below, a second repeating unit represented by Chemical Formula 2 below, and a third repeating unit represented by Chemical Formula 3 below, and the dispersion medium is a non-aqueous solvent:

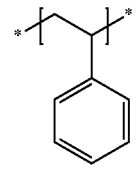

[Chemical Formula 1]

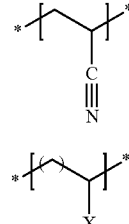

[Chemical Formula 2]

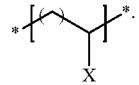

[Chemical Formula 3]

In Chemical Formula 3, X is hydrogen, a C1 to C30 alkyl group, or a C1 to C30 alkyl ester group, and 1 is an integer ranging from 1 to 10.

Another aspect of the present invention provides an electrode which includes an electrode active material layer formed of an electrode slurry composition including an electrode active material, the above-described conductive material dispersion liquid, a binder, and a solvent. In this case, the electrode may be a positive electrode.

Still another aspect of the present invention provides a lithium secondary battery which includes a positive electrode, a negative electrode, a separator interposed between the positive electrode and the negative electrode, and an electrolyte. In this case, the positive electrode may be the electrode according to the present invention.

A conductive material dispersion liquid according to the present invention can attain low viscosity even when a relatively large amount of a carbon-based conductive material is included in the conductive material dispersion liquid by using, as a dispersant, a copolymer including a repeating unit having high affinity with a carbon-based conductive material and a repeating unit having high affinity with a dispersion medium.

In addition, a copolymer dispersant according to the present invention is not agglomerated despite having a low weight-average molecular weight of 100,000 or less, and accordingly, excellent storage stability can be attained. Therefore, the use of the copolymer dispersant according to the present invention is more advantageous for lowering the viscosity of the conductive material dispersion liquid because it is possible to use a dispersant having a weight-average molecular weight lower than that in a conventional case.

DETAILED DESCRIPTION

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

It should be understood that the terms "comprises," "comprising," "includes," "including," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

In the specification, the "specific surface area" is measured by a BET method, and specifically, may be calculated from the amount of nitrogen gas adsorbed at a liquid nitrogen temperature (77 K) using BELSORP-mini II commercially available from BEL Japan.

In the specification, the "weight-average molecular weight (Mw)" refers to a conversion value with respect to standard polystyrene measured through gel permeation chromatography (GPC). Specifically, the weight-average molecular weight is a value obtained by converting a value measured under the following conditions using GPC, and standard polystyrene of an Agilent system is used to make a calibration curve.

<Measurement Conditions>
Measurement instrument: Agilent GPC (Agilent 1200 series, US)
Column: two connected PL Mixed B columns
Column temperature: 40° C.
Eluent: Tetrahydrofuran
Flow rate: 1.0 mL/min
Concentration: ~1 mg/mL (100 μL injection)

Hereinafter, the present invention will be described in detail.

Conductive Material Dispersion Liquid

Firstly, a conductive material dispersion liquid according to the present invention will be described.

A conductive material dispersion liquid according to the present invention includes (1) a carbon-based conductive material, (2) a dispersant, and (3) a dispersion medium. Here, (2) the dispersant is a copolymer including a first repeating unit represented by Chemical Formula 1 below, a second repeating unit represented by Chemical Formula 2 below, and a third repeating unit represented by Chemical Formula 3 below:

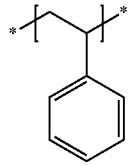

[Chemical Formula 1]

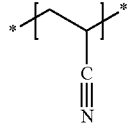

[Chemical Formula 2]

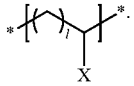

[Chemical Formula 3]

In Chemical Formula 3, X is hydrogen, a C1 to C30 alkyl group, or a C1 to C30 alkyl ester group, and l is an integer ranging from 1 to 10.

Since the copolymer used as the dispersant in the present invention includes a first repeating unit derived from styrene, the dispersant does not form a gel and maintains dispersibility despite having a low weight-average molecular weight, such that excellent storage stability is attained.

In addition, since the copolymer includes a second repeating unit with high polarity and a third repeating unit with low polarity, the dispersant has high affinity with both the carbon-based conductive material and the dispersion medium.

Specifically, the third repeating unit with low polarity interacts with the carbon-based conductive material to form a physical or chemical bond, and the second repeating unit having a cyano group with high polarity enhances miscibility with the dispersion medium, such as N-methyl pyrrolidone.

Therefore, when the copolymer according to the present invention is used as the dispersant, the carbon-based conductive material can be uniformly dispersed in the dispersion medium, and, even when a relatively large amount of the carbon-based conductive material is included, low viscosity can be attained. In addition, according to the present invention, the use of a dispersant with a low weight-average molecular weight is possible such that the viscosity of the conductive material dispersion liquid can be further lowered.

Hereinafter, each component of the conductive material dispersion liquid according to the present invention will be described in detail.

(1) Carbon-Based Conductive Material

The carbon-based conductive material is used to enhance the conductivity of an electrode, and a carbon-based conductive material used in the art, for example, carbon nanotubes, carbon black, or the like, may be used.

The carbon nanotube is a graphite sheet in the form of a cylinder having a nano-sized diameter and has a $sp^2$ bonding structure. In this regard, the graphite sheet exhibits characteristics of a conductor or a semiconductor according to the rolling angle and structure. The carbon nanotubes may be classified into single-walled carbon nanotubes (SWCNTs), double-walled carbon nanotubes (DWCNTs), and multi-walled carbon nanotubes (MWCNTs) according to the number of bonds forming the walls, and these carbon nanotubes may be appropriately selected according to the area of application of the dispersion liquid.

In addition, the carbon nanotubes may have a secondary structural form in which a plurality of carbon nanotubes are agglomerated or arranged and may be, for example, bundle-type carbon nanotubes in a bundle or rope form in which a plurality of carbon nanotubes are aligned or arranged in a certain direction or entangled-type carbon nanotubes in a sphere or potato form in which a plurality of carbon nanotubes are entangled with each other without a certain orientation. In terms of dispersibility, it is more preferable that the carbon nanotubes are bundle-type carbon nanotubes.

Meanwhile, as the carbon black, commercially available furnace black, channel black, thermal black, acetylene black, Ketjen black, hollow carbon black, or the like may be used, and a type thereof is not particularly limited.

The carbon black may be carbon black whose surface has been treated by a method known in the art, as necessary. For example, the carbon black may be carbon black from which impurities are removed by surface treatment with acetylene gas. In addition, the carbon black may be carbon black with a purity of 99.5% or more.

Meanwhile, the carbon-based conductive material used in the present invention may have a BET specific surface area of 1,000 m²/g or less, preferably, 30 to 1,000 m²/g. When the BET specific surface area of the carbon-based conductive material exceeds 1,000 m²/g, dispersion may not smoothly proceed.

Specifically, when the carbon-based conductive material is a carbon nanotube, the BET specific surface area of the carbon nanotube may be 100 to 1,000 m²/g, preferably 150 to 1,000 m²/g, and more preferably 150 to 800 m²/g.

When the carbon-based conductive material is carbon black, the BET specific surface area of the carbon black may be 30 to 1,000 m²/g, preferably 30 to 400 m²/g, and more preferably 30 to 380 m²/g.

Meanwhile, the carbon-based conductive material may be included at 0.1 to 30 wt %, preferably, 1 to 30 wt % in the conductive material dispersion liquid. Specifically, when the carbon-based conductive material is a carbon nanotube, the content of the carbon-based conductive material in the conductive material dispersion liquid may be 0.1 to 10 wt %, preferably, 1 to 8 wt %, and when the carbon-based conductive material is carbon black, the content thereof may be 1 to 30 wt %, preferably, 1 to 25 wt %. In addition, when the content of the carbon-based conductive material is excessively low, an amount of the carbon-based conductive material loaded in the manufacture of an electrode is decreased such that process costs increase, and binder migration occurs during the drying of an electrode such that adhesion may be decreased. On the other hand, when the content of the carbon-based conductive material is excessively high, the viscosity of the conductive material dispersion liquid is increased.

(2) Dispersant

The conductive material dispersion liquid according to the present invention includes, as a dispersant, a copolymer including a first repeating unit represented by Chemical Formula 1 below, a second repeating unit represented by Chemical Formula 2 below, and a third repeating unit represented by Chemical Formula 3 below:

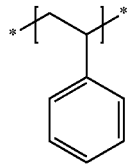

[Chemical Formula 1]

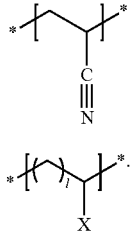

[Chemical Formula 2]

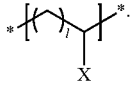

[Chemical Formula 3]

In Chemical Formula 3, X is hydrogen, a C1 to C30 alkyl group, or a C1 to C30 alkyl ester group, and 1 is an integer ranging from 1 to 10.

The first repeating unit is a unit derived from a styrene monomer and is used to enhance the storage stability of the conductive material dispersion liquid. According to research conducted by the inventor of the present invention, when a copolymer including the first repeating unit is used, although the dispersant has a low weight-average molecular weight of 100,000 g/mol or less, the dispersibility of the conductive material dispersion liquid is maintained at a superior level, and gelation is suppressed.

The first repeating unit may be included at 1 to 25 mol %, preferably 5 to 20 mol %, and more preferably 5 to 15 mol %, in the copolymer. When the mole percent of the first repeating unit is excessively high, the viscosity of the conductive material dispersion liquid is increased, and when excessively low, an insignificant effect of improving storage stability is exhibited.

The second repeating unit is a unit derived from an acrylonitrile monomer and includes a cyano group with high polarity to exhibit high miscibility with the dispersion medium. The second repeating unit may be included at 10 to 50 mol %, preferably 15 to 50 mol %, and more preferably 20 to 50 mol %, in the copolymer. When the mole percent of the second repeating unit is excessively high, the dispersibility of the conductive material dispersion liquid may be degraded, and viscosity may be increased.

The third repeating unit interacts with the carbon-based conductive material to disperse the carbon-based conductive material in the dispersion medium, and is a unit derived from a monomer such as an alkyl (meth)acrylate monomer, an alkene monomer, a conjugated diene-based monomer, or the like.

Examples of the alkyl (meth)acrylate monomer include methyl (meth)acrylate, propyl (meth)acrylate, isopropyl (meth)acrylate, n-butyl (meth)acrylate, isobutyl (meth)acrylate, n-amyl (meth)acrylate, isoamyl (meth)acrylate, 2-ethylhexyl (meth)acrylate, 2-ethylbutyl (meth)acrylate, pentyl (meth)acrylate, hexyl (meth)acrylate, cyclohexyl (meth)acrylate, n-octyl (meth)acrylate, isooctyl (meth)acrylate, isononyl (meth)acrylate, decyl (meth)acrylate, dodecyl (meth)acrylate, tridecyl (meth)acrylate, tetradecyl (meth)acrylate, octadecyl (meth)acrylate, isobornyl (meth)acrylate, and the like, but the present invention is not limited thereto.

Examples of the alkene monomer include propene, butene, pentene, hexene, heptene, octene, nonene, decene, dodecene, tridecene, tetradecene, octadecene, and the like, but the present invention is not limited thereto.

Examples of the conjugated diene-based monomer include 1,3-butadiene, isoprene, 2,3-methyl butadiene, and the like, but the present invention is not limited thereto.

More specifically, the third repeating unit represented by Chemical Formula 3 may be selected from the group consisting of repeating units represented by Chemical Formula 3-1 to Chemical Formula 3-3 below:

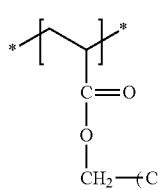

[Chemical Formula 3-1]

In Chemical Formula 3-1, m is an integer ranging from 1 to 20, preferably an integer ranging from 1 to 15, and more preferably an integer ranging from 2 to 10.

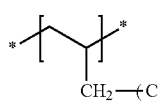

[Chemical Formula 3-2]

In Chemical Formula 3-2, n is an integer ranging from 1 to 20, preferably an integer ranging from 1 to 15, and more preferably an integer ranging from 2 to 10.

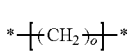

[Chemical Formula 3-3]

In Chemical Formula 3-3, o is an integer ranging from 1 to 10, preferably an integer ranging from 2 to 10, and more preferably an integer ranging from 2 to 8.

The third repeating unit may be included at 30 to 80 mol %, preferably 40 to 80 mol %, and more preferably 45 to 70 mol %, in the copolymer. When the mole percent of the third repeating unit satisfies the above-described range, the carbon-based conductive material exhibits excellent dispersibility.

Meanwhile, the copolymer according to the present invention may further include a fourth repeating unit represented by Chemical Formula 4 below as necessary:

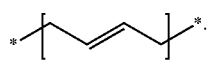

[Chemical Formula 4]

When the fourth repeating unit is further included, a pi bond is formed between the double bond of the fourth repeating unit and the carbon-based conductive material, thereby facilitating the bonding between the surface of the carbon-based conductive material and the dispersant. Accordingly, the wetting of the carbon-based conductive material smoothly proceeds in the preparation of the dispersion liquid, which can shorten the dispersion time.

The fourth repeating unit may be included at 35 mol % or less, preferably 0.1 to 35 mol %, and more preferably 0.5 to 30 mol %, in the copolymer. When the mole percent of the fourth repeating unit exceeds 35 mol %, solubility in the dispersion medium may be degraded.

Specifically, the copolymer according to the present invention may include the first repeating unit represented by Chemical Formula 1, the second repeating unit represented by Chemical Formula 2, the third repeating unit represented by Chemical Formula 3-3, and the fourth repeating unit represented by Chemical Formula 4, wherein o in Chemical Formula 3-3 may be 4. The quaternary copolymer as described above may be prepared by copolymerizing a styrene monomer, an acrylonitrile monomer, and a butadiene monomer and then partially hydrogenating the resulting copolymer. In this case, the polymerization and hydrogenation may be carried out by conventionally used methods.

Meanwhile, the copolymer may have a weight-average molecular weight of 10,000 to 100,000 g/mol, preferably 20,000 to 100,000 g/mol, and more preferably 30,000 to 100,000 g/mol. When the weight-average molecular weight of the copolymer satisfies the above-described range, the viscosity of the conductive material dispersion liquid can be further lowered, and accordingly, the content of the carbon-based conductive material can be increased compared to a conventional case, which is advantageous for enhancing electrical conductivity.

Meanwhile, the content of the copolymer dispersant in the conductive material dispersion liquid according to the present invention may vary depending on a type or specific surface area of the carbon-based conductive material used together therewith. For example, when it is assumed that the content of the copolymer dispersant with respect to 100 parts by weight of the carbon-based conductive material is a (units: parts by weight), and the BET specific surface area of the carbon-based conductive material is b, it is preferable that the a satisfies Expression (1) below.

$$0.05 \times b \leq a \leq 0.15 \times b \qquad \text{Expression (1):}$$

When the content of the copolymer dispersant satisfies the above Expression (1), the viscosity of the conductive material dispersion liquid can be maintained at a low level due to excellent wettability of the carbon-based conductive material.

(3) Dispersion Medium

The dispersion medium is used to disperse the carbon-based conductive material and is a non-aqueous solvent. Since the copolymer used as the dispersant in the present invention is not easily dissolved in an aqueous solvent such as water, when an aqueous solvent is applied as the dispersion medium, the carbon-based conductive material is not smoothly dispersed. In addition, since a positive electrode active material is vulnerable to water, when the conductive material dispersion liquid including water is applied to a positive electrode slurry, a positive electrode active material may be damaged such that degrade electrode performance. Additionally, since PVDF, which is mainly used as a binder of a positive electrode slurry, is agglomerated when in contact with water, when a conductive material dispersion liquid including water as a dispersion medium is applied to the PVDF-containing positive electrode slurry composition, agglomeration occurs, making the formation of an electrode difficult.

Preferably, the dispersion medium may be an organic solvent including any one or more heteroatoms selected from the group consisting of a nitrogen atom (N) and an oxygen atom (O) having a lone pair of electrons.

Specifically, the dispersion medium may be an amide-based polar organic solvent such as dimethylformamide (DMF), diethylformamide, dimethylacetamide (DMAc), N-methyl pyrrolidone (NMP), or the like; an alcohol such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, octanol, or the like; a glycol such as ethylene glycol, diethylene glycol, triethylene glycol, propylene glycol, 1,3-propanediol, 1,3-butanediol, 1,5-pentanediol, hexylene glycol, or the like; a polyhydric alcohol such as glycerin, trimethylolpropane, pentaerythritol, sorbitol, or the like; a glycol ether such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, tetraethylene glycol monobutyl ether, or the like; a ketone such as acetone, methyl ethyl ketone, methyl propyl ketone, cyclopentanone, or the like; an ester such as ethyl acetate, γ-butyl lactone, ε-propiolactone, or the like; or the like, which may be used alone or in combination of two or more thereof. Among those listed above, NMP is particularly preferred in consideration of miscibility with a solvent used in an electrode slurry.

The conductive material dispersion liquid according to the present invention, which includes the above-described components, may be prepared by mixing the carbon-based conductive material, the copolymer dispersant, and the dispersion medium. In this case, the mixing may be carried out by a conventional mixing method, specifically, by using a mixing apparatus such as a homogenizer, a bead mill, a ball mill, a basket mill, an attrition mill, a universal agitator, a clear mixer, a spike mill, a TK mixer, or the like, and the mixing order of each component is not particularly limited. That is, the conductive material dispersion liquid according to the present invention may be prepared by adding the carbon-based conductive material to the dispersion medium, then adding the copolymer dispersant thereto, and mixing them, by adding the copolymer dispersant to the dispersion medium and then mixing them with the carbon-based conductive material, or by adding the copolymer dispersant and the carbon-based conductive material together to the dispersion medium and then mixing them.

Meanwhile, in the mixing process, a cavitation dispersion process may be carried out to increase the dispersibility of the carbon-based conductive material. The cavitation dispersion process is a dispersion treatment method using a shock wave produced by the collapse of vacuum bubbles generated in water when high energy is applied to the liquid, and this method may allow the carbon-based conductive material to be dispersed without damaging its characteristics. Specifically, the cavitation dispersion process may be carried out by ultrasonic waves, a jet mill, or shear dispersion treatment.

The conductive material dispersion liquid according to the present invention as prepared above exhibits low viscosity and excellent storage stability. Specifically, the conductive material dispersion liquid including a solid content of 4.8 wt % may have a viscosity of 40 Pa·s or less, preferably, 30 Pa·s or less, as measured at room temperature and 1 rpm.

Electrode

Next, an electrode according to the present invention will be described.

An electrode according to the present invention includes an electrode active material layer formed of an electrode slurry composition including an electrode active material, a conductive material dispersion liquid, and a binder. Specifically, the electrode includes an electrode current collector and an electrode active material layer formed on the electrode current collector, wherein the electrode active material layer may be formed of an electrode slurry composition including an electrode active material, a conductive material dispersion liquid, and a binder.

In this case, the conductive material dispersion liquid is the above-described conductive material dispersion liquid according to the present invention. The conductive material dispersion liquid may be included in an amount such that the content of a conductive material is 0.1 to 5 wt %, preferably, 0.3 to 4 wt % based on the total solid content in the electrode slurry composition. When the content of the conductive material dispersion liquid satisfies the above-described range, a superior effect of enhancing electrical conductivity is exhibited.

Since descriptions of the conductive material dispersion liquid are the same as provided above, detailed descriptions thereof will be omitted, and hereinafter, the other components will be described.

The electrode current collector is not particularly limited as long as it does not cause a chemical change in the battery and has conductivity. For example, copper, stainless steel, aluminum, nickel, titanium, alloys thereof, any of these surface-treated with carbon, nickel, titanium, or silver, calcined carbon, or the like may be used.

The electrode current collector may typically have a thickness of 3 μm to 500 μm, and may have fine irregularities in a surface thereof to increase the adhesion of a electrode active material. In addition, the electrode current collector may be used in any of various forms such as a film, a sheet, a foil, a net, a porous material, a foam, a non-woven fabric, and the like.

Meanwhile, the electrode active material included in the electrode active material layer may be a positive electrode active material or a negative electrode active material commonly used in the art, and types thereof are not particularly limited.

For example, the positive electrode active material may be a lithium oxide including lithium and one or more types of metals such as cobalt, manganese, nickel, and aluminum. More specifically, the lithium oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (where $0<Y1<1$), $LiNi_{Z1}Mn_{2-Z1}O_4$ (where $0<Z1<2$), etc.), a lithium-nickel-cobalt-based oxide (e.g., $LiNi_{1-Y2}Co_{Y2}O_2$ (where $0<Y2<1$), etc.), a lithium-manganese-cobalt-based oxide (e.g., $LiCo_{1-Y3}Mn_{Y3}O_2$ (where $0<Y3<1$), $LiMn_{2-Z2}Co_{Z2}O_4$ (where $0<Z2<2$), etc.), a lithium-nickel-cobalt-manganese-based oxide (e.g., $Li(Ni_{P1}Co_{Q1}Mn_{R1})O_2$ (where $0<P1<1$, $0<Q1<1$, $0<R1<1$, $P1+Q1+R1=1$) or $Li(Ni_{P2}Co_{Q2}Mn_{R2})O_4$ (where $0<P2<2$, $0<Q2<2$, $0<R2<2$, $P2+Q2+R2=2$), etc.), or a lithium-nickel-cobalt-manganese-other metal (M) oxide (e.g., $Li(Ni_{P3}Co_{Q3}Mn_{R3}M1_S)O_2$ (where M1 is selected from the group consisting of Al, Cu, Fe, V, Cr, Ti, Zr, Zn, Ta, Nb, Mg, N, W, and Mo, P3, Q3, R3 and S are respective atomic fraction of elements which are independent of one another, and $0<P3<1$, $0<Q3<1$, $0<R3<1$, $0<S<1$, $P3+Q3+R3+S=1$), etc.), which may be used alone or in combination of two or more thereof.

Meanwhile, the negative electrode active material may be, for example, a carbonaceous material such as artificial graphite, natural graphite, graphitized carbon fiber, amorphous carbon, or the like; a metallic compound capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_v$ ($0<v<2$), $SnO_2$, vanadium oxide, or lithium vanadium oxide; or a composite including the metallic compound and the carbonaceous material, such as a Si—C composite or a Sn—C composite, which may be used alone or in combination of two or more thereof. In addition, as the negative electrode active material, a lithium metal thin film may be used. Additionally, as a carbon material, both of low-crystalline carbon and high-crystalline carbon may be used.

The electrode active material may be included at 70 to 99 wt %, preferably 80 to 98 wt %, based on the total solid content in the electrode slurry composition. When the content of the electrode active material satisfies the above-described range, excellent energy density, excellent adhesion to the electrode, and excellent electrical conductivity can be attained.

The binder serves to ensure the adhesion between electrode active materials or the adhesion between the electrode active material and the current collector, and any binder may be used without particular limitation as long as it is commonly used in the art. The binder may be, for example, polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, styrene-butadiene rubber (SBR), fluoro-rubber, various copolymers thereof, or the like, which may be used alone or in combination of two or more thereof.

The binder may be included at 5 wt % or less, preferably, 1 to 3 wt % based on the total solid content in the electrode slurry composition. When the content of the binder satisfies the above-described range, excellent adhesion to the electrode can be attained with a minimized increase in electrode resistance.

Meanwhile, the electrode slurry composition may further include a solvent, as necessary, to adjust viscosity. In this case, the solvent may be water, an organic solvent, or a mixture thereof. The organic solvent may be, for example, an amide-based polar organic solvent such as dimethylformamide (DMF), diethylformamide, dimethylacetamide (DMAc), N-methyl pyrrolidone (NMP), or the like; an alcohol such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, octanol, or the like; a glycol such as ethylene glycol, diethylene glycol, triethylene glycol, propylene glycol, 1,3-propanediol, 1,3-butanediol, 1,5-pentanediol, hexylene glycol, or the like; a polyhydric alcohol such as glycerin, trimethylolpropane, pentaerythritol, sorbitol, or the like; a glycol ether such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, tetraethylene glycol monobutyl ether, or the like; a ketone such as acetone, methyl ethyl ketone, methyl propyl ketone, cyclopentanone, or the like; an ester such as ethyl acetate, γ-butyl lactone, ε-propiolactone, or the like; or the like, which may be used alone or in combination of two or more thereof, but the present invention is not limited thereto.

The solvent may be included in an amount such that the solid content in the electrode slurry is 60 to 85 wt %, preferably, 65 to 80 wt %. When the solid content in the slurry is less than 60 wt %, an amount of the electrode slurry loaded in the electrode is decreased such that process costs may increase, and binder migration occurs such that adhesion to the electrode may be decreased, and a defect in coating may occur. On the other hand, when the solid content in the slurry is greater than 85 wt %, the viscosity of the electrode slurry is excessively increased such that processability may be degraded, and a defect in coating may occur.

The electrode according to the present invention may be manufactured by forming an electrode active material layer by applying and drying an electrode slurry composition containing the above-described components. Specifically, the electrode active material layer may be formed by applying an electrode slurry on an electrode current collector and then drying the same or by laminating, on an electrode current collector, a film prepared by applying an electrode slurry on a separate support and then removing it from the support. As necessary, after the electrode active material layer is formed by the above-described method, a rolling process may be further carried out. In this case, the drying and rolling process may be carried out under appropriate conditions in consideration of physical properties of the electrode to be finally manufactured, and the conditions are not particularly limited.

Lithium Secondary Battery

Next, a secondary battery according to the present invention will be described.

A secondary battery according to the present invention includes the above-described electrode according to the present invention. In this case, the electrode may be at least one of a positive electrode and a negative electrode. Specifically, the secondary battery according to the present invention may include a positive electrode, a negative electrode, a separator interposed between the positive electrode and the negative electrode, and an electrolyte, and, in this case, at least one of the positive electrode and the negative electrode may be the above-described electrode according to the present invention. Preferably, the electrode according to the present invention is a positive electrode.

Since descriptions of the electrode according to the present invention have been provided above, detailed descriptions thereof will be omitted, and hereinafter, the other components will be described.

The separator serves to separate the negative electrode and the positive electrode and provide a passage for lithium ion migration, and any separator commonly used in a lithium secondary battery may be used without particular limitation. Specifically, as the separator, a porous polymer film, for example, a porous polymer film formed of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof may be used. In addition, a common porous non-woven fabric, for example, a non-woven fabric made of high-melting-point glass fiber, polyethylene terephthalate fiber, or the like may be used. Also, in order to ensure heat resistance or mechanical strength, a coated separator which includes a ceramic component or polymer material and is optionally in a single-layer or multi-layer structure may be used.

As the electrolyte, an organic liquid electrolyte, an inorganic liquid electrolyte, a solid polymer electrolyte, a gel-type polymer electrolyte, an inorganic solid electrolyte, a molten-type inorganic electrolyte, or the like that is usable in the manufacture of a lithium secondary battery may be used without particular limitation.

Specifically, the electrolyte may include a non-aqueous organic solvent and a metal salt.

As the non-aqueous organic solvent, for example, an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, ethyl propionate, or the like may be used.

Among the carbonate-based organic solvents, especially, ethylene carbonate and propylene carbonate, which are cyclic carbonates, are preferably used because they are high-viscosity organic solvents and have high permittivity, thereby satisfactorily dissociating a lithium salt. When such cyclic carbonates are mixed with a low-viscosity, low-permittivity linear carbonate, such as dimethyl carbonate and diethyl carbonate, in an appropriate ratio and used, an electrolyte having high electrical conductivity may be prepared, and therefore, such mixtures are more preferably used.

As the metal salt, a lithium salt may be used, and the lithium salt is a substance that is easy to dissolve in the non-aqueous electrolyte solution. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^{-1}$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In addition to the above-described electrolyte components, one or more types of additives such as a haloalkylene carbonate-based compound such as difluoroethylene carbonate or the like, pyridine, triethylphosphite, triethanolamine, a cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like may be further included in the electrolyte for the purpose of enhancing the lifetime characteristics of the battery, suppressing a reduction in battery capacity, enhancing the discharge capacity of the battery, and the like.

Hereinafter, the present invention will be described in further detail by way of specific examples.

EXAMPLES

Example 1

4 parts by weight of carbon nanotubes (BT1003 commercially available from LG Chem.) having a BET specific surface area of 190 $m^2/g$ as a conductive material and 0.8 part by weight of a copolymer A (weight-average molecular weight: 32,000 g/mol) including a styrene unit, an acrylonitrile unit, and a butyl acrylate unit in a molar ratio of 5:40:55 as a dispersant were added to N-methyl pyrrolidone to prepare a conductive material dispersion liquid including a solid content of 4.8 wt %.

Example 2

A conductive material dispersion liquid was prepared in the same manner as in Example 1 except that a copolymer B (weight-average molecular weight: 36,000 g/mol) including a styrene unit, an acrylonitrile unit, and a butyl acrylate unit in a molar ratio of 10:40:50 was used as a dispersant instead of the copolymer A.

Example 3

A conductive material dispersion liquid was prepared in the same manner as in Example 1 except that a copolymer C (weight-average molecular weight: 35,000 g/mol) including a styrene unit, an acrylonitrile unit, and a butyl acrylate unit in a molar ratio of 15:40:45 was used as a dispersant instead of the copolymer A.

Example 4

A conductive material dispersion liquid was prepared in the same manner as in Example 1 except that a copolymer D (weight-average molecular weight: 43,000 g/mol) including a styrene unit, an acrylonitrile unit, and a lauryl acrylate unit in a molar ratio of 15:40:45 was used as a dispersant instead of the copolymer A.

Example 5

A conductive material dispersion liquid was prepared in the same manner as in Example 1 except that a copolymer E (weight-average molecular weight: 50,000 g/mol) including a styrene unit, an acrylonitrile unit, and a hydrogenated butadiene unit in a molar ratio of 15:20:65 was used as a dispersant instead of the copolymer A.

Example 6

A conductive material dispersion liquid was prepared in the same manner as in Example 1 except that a copolymer F (weight-average molecular weight: 90,000 g/mol) including a styrene unit, an acrylonitrile unit, and a hydrogenated butadiene unit in a molar ratio of 10:20:70 was used as a dispersant instead of the copolymer A.

Comparative Example 1

A conductive material dispersion liquid was prepared in the same manner as in Example 1 except that DISPERBYK-2200 (commercially available from BYK Additives & Instruments) was used as a dispersant instead of the copolymer A.

Comparative Example 2

A conductive material dispersion liquid was prepared in the same manner as in Example 1 except that a copolymer G (weight-average molecular weight: 150,000 g/mol)

including a styrene unit and an acrylonitrile unit in a molar ratio of 55:45 was used as a dispersant instead of the copolymer A.

Comparative Example 3

A conductive material dispersion liquid was prepared in the same manner as in Example 1 except that a copolymer H (weight-average molecular weight: 61,000 g/mol) including an acrylonitrile unit and a butyl acrylate unit in a molar ratio of 40:60 was used as a dispersant instead of the copolymer A.

Comparative Example 4

A conductive material dispersion liquid was prepared in the same manner as in Example 1 except that a copolymer I (weight-average molecular weight: 165,000 g/mol) including a styrene unit and a butyl acrylate unit in a molar ratio of 30:70 was used as a dispersant instead of the copolymer A.

Comparative Example 5

A conductive material dispersion liquid was prepared in the same manner as in Example 1 except that a copolymer J (weight-average molecular weight: 34,000 g/mol) including a styrene unit and a butadiene unit in a molar ratio of 21:79 was used as a dispersant instead of the copolymer A.

Comparative Example 6

A conductive material dispersion liquid was prepared in the same manner as in Example 1 except that water was used instead of N-methyl pyrrolidone.

Experimental Example 1: Measurement of Initial Viscosity 500 g of each of the conductive material dispersion liquids prepared in Examples 1 to 6 and Comparative Examples 1 to 6 was mixed with zirconia beads having a diameter of 1 mm and then dispersed for an hour through a milling process at 3,000 rpm using a Mini-Cer instrument commercially available from NETZSCH, and an initial viscosity was measured. The viscosity was measured at 25° C. and 1 rpm using a viscometer (TVE-22L commercially available from Toki).

Measurement results are shown in the following Table 1.

TABLE 1

| Classification | Initial viscosity [Pa · s] |
| --- | --- |
| Example 1 | 18 |
| Example 2 | 15 |
| Example 3 | 24 |
| Example 4 | 25 |
| Example 5 | 5 |
| Example 6 | 10 |
| Comparative Example 1 | 55 |
| Comparative Example 2 | 45 |
| Comparative Example 3 | 47 |
| Comparative Example 4 | 50 |
| Comparative Example 5 | 10 |
| Comparative Example 6 | Not measurable |

Experimental Example 2: Storage Stability 500 g of each of the conductive material dispersion liquids prepared in Examples 1 to 6 and Comparative Example 5 was mixed with zirconia beads having a diameter of 1 mm, then dispersed for an hour through a milling process at 3,000 rpm using a Mini-Cer instrument commercially available from NETZSCH, and allowed to stand for a week. Afterward, a viscosity was measured. The viscosity was measured at 25° C. and 1 rpm using a viscometer (TVE-22L commercially available from Toki), and measurement results are shown the following Table 2.

TABLE 2

| Classification | Viscosity after 1 week [Pa · s] |
| --- | --- |
| Example 1 | 22 |
| Example 2 | 18 |
| Example 3 | 26 |
| Example 4 | 29 |
| Example 5 | 6 |
| Example 6 | 13 |
| Comparative Example 5 | 30 |

As shown in Table 1 and Table 2, the conductive material dispersion liquids according to Examples 1 to 6, in which the copolymer dispersant of the present invention was used, exhibited a low initial viscosity of less than 30 Pa·s and did not show a significant increase in viscosity even after 1 week of storage, and therefore, it can be seen based on these results that they exhibited excellent storage stability.

On the other hand, the conductive material dispersion liquids according to Comparative Examples 1 to 4 exhibited a high initial viscosity of more than 40 Pa·s, and although the conductive material dispersion liquid according to Comparative Example 5 exhibited a low initial viscosity, the viscosity thereof was significantly increased after 1 week of storage, and therefore, it can be seen based on these results that storage stability was degraded.

Meanwhile, in the case of Comparative Example 6 in which water was used as a dispersion medium, milling was impossible due to the agglomeration of carbon nanotubes so an initial viscosity was not measurable.

The invention claimed is:

1. A conductive material dispersion liquid comprising a carbon-based conductive material, a dispersant, and a dispersion medium,
wherein the dispersant is a copolymer comprising a first repeating unit of Chemical Formula 1 in an amount of 1 mol % to 20 mol %; a second repeating unit of Chemical Formula 2 in an amount of 10 mol % to 50 mol %; and a third repeating unit of Chemical Formula 3 in an amount of 30 mol % to 80 mol %, based on total moles of the first, second, and third repeating units, and
wherein the dispersion medium is a non-aqueous solvent,

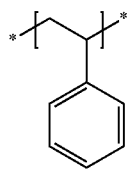

[Chemical Formula 1]

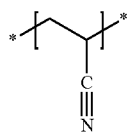

[Chemical Formula 2]

[Chemical Formula 3]

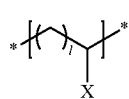

wherein in Chemical Formula 3, X is hydrogen, a C1 to C30 alkyl group, or a C1 to C30 alkyl ester group, and 1 is an integer ranging from 1 to 10.

2. The conductive material dispersion liquid of claim 1, wherein the third repeating unit is selected from the group consisting of repeating units of Chemical Formula 3-1, Chemical Formula 3-2 and Chemical Formula 3-3:

[Chemical Formula 3-1]

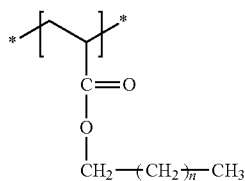

wherein in Chemical Formula 3-1, m is an integer ranging from 1 to 20,

[Chemical Formula 3-2]

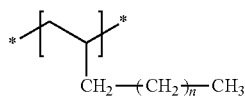

wherein in Chemical Formula 3-2, n is an integer ranging from 1 to 20, and

[Chemical Formula 3-3]

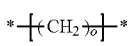

wherein in Chemical Formula 3-3, o is an integer ranging from 2 to 10.

3. The conductive material dispersion liquid of claim 1, wherein the copolymer further includes a fourth repeating unit of Chemical Formula 4:

[Chemical Formula 4]

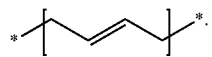

4. The conductive material dispersion liquid of claim 3, wherein the copolymer comprises the fourth repeating unit in an amount of 35 mol % or less.

5. The conductive material dispersion liquid of claim 1, wherein the copolymer has a weight-average molecular weight of 10,000 g/mol to 100,000 g/mol.

6. The conductive material dispersion liquid of claim 1, wherein the carbon-based conductive material is included in an amount of 0.1 wt % to 30 wt % based on a total weight of the conductive material dispersion liquid.

7. The conductive material dispersion liquid of claim 1, which satisfies Expression (1) below, wherein a is a content of the copolymer dispersant with respect to 100 parts by weight of the carbon-based conductive material, and b is a BET specific surface area of the carbon-based conductive material:

$$0.05 \times b \leq a \leq 0.15 \times b. \quad \text{Expression (1):}$$

8. The conductive material dispersion liquid of claim 1, wherein the carbon-based conductive material is carbon nanotubes or carbon black.

9. The conductive material dispersion liquid of claim 1, wherein the dispersion medium is an organic solvent including one or more heteroatoms selected from the group consisting of a nitrogen atom (N) and an oxygen atom (O) having a lone pair of electrons.

10. The conductive material dispersion liquid of claim 9, wherein the dispersion medium is N-methyl pyrrolidone.

11. An electrode comprising an electrode active material layer formed of an electrode slurry composition comprising an electrode active material, the conductive material dispersion liquid of claim 1, a binder, and a solvent.

12. The electrode of claim 11, which is a positive electrode.

13. A lithium secondary battery comprising a positive electrode, a negative electrode, a separator interposed between the positive electrode and the negative electrode, and an electrolyte,
wherein the positive electrode is the electrode of claim 11.

* * * * *